106. COMPOSITIONS, COATING OR PLASTIC

CROSS REFERENCE

92

(No Model.)

J. S. PEIRCE.
ARTIFICIAL STONE AND THE PROCESS OF MANUFACTURING.

No. 369,959. Patented Sept. 13, 1887.

Witnesses:

Inventor
James S. Peirce,
By his Attorney,
Wm. G. Henderson.

UNITED STATES PATENT OFFICE.

JAMES STANDWOOD PEIRCE, OF PORTSMOUTH, NEW HAMPSHIRE.

ARTIFICIAL STONE AND THE PROCESS OF MANUFACTURING.

SPECIFICATION forming part of Letters Patent No. 369,959, dated September 13, 1887.

Application filed January 10, 1887. Serial No. 223,921. (No model.)

*To all whom it may concern:*

Be it known that I, JAMES STANDWOOD PEIRCE, a citizen of the United States, residing at Portsmouth, in the county of Rockingham and State of New Hampshire, have invented certain new and useful Improvements in Processes of Manufacturing Artificial Stone and Blocks Made therefrom; and I do hereby declare the following to be a full, clear, and exact description of the invention, such as will enable others skilled in the art to which it appertains to make and use the same.

My invention relates to improvements in artificial-stone building-blocks and composition entering into the same, whereby compactness and hardness are obtained and sweating is more completely prevented than heretofore; and to those ends the invention consists in the process and the product hereinafter particularly described, and then specifically defined by the claims.

Figure 1:
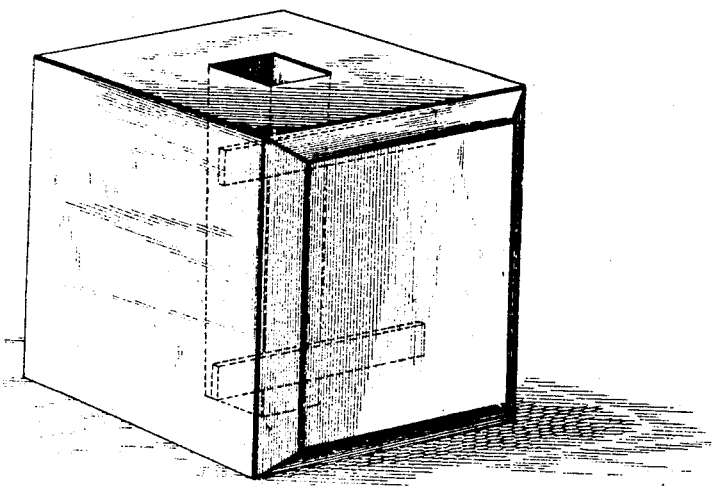
Figure 2:
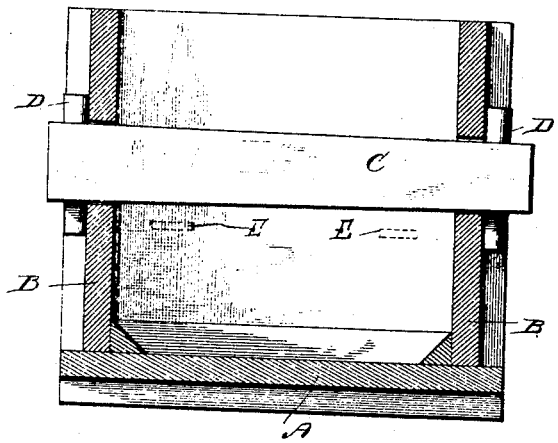

In the accompanying drawings, Figure 1 is a perspective of a building-block made according to the process. Fig. 2 is a vertical section through the mold, with the core in full lines and laths or stays in dotted lines.

The mold—which is not claimed in this application, but forms the subject-matter of an application filed in the United States Patent Office June 8, 1885, and bearing the serial number 168,056—may be described, generally, as composed of a bottom, A, removable sides B, and a core, C, passed through from one side to the other and removable without disturbing the sides, and held firmly in place by pins D. A fuller description is not necessary here, because the mold forms, as stated, the subject of a separate application.

The materials composing the stone are: some good cement—say Portland—two parts; clean silicious sand, two parts; gravel, or rock or stone broken into small pieces, two parts; calcined lime, two parts; pulverized alum, one part, and silicate of soda or silicate of potash, one part. To the above may be added powdered porcelain, one part.

The parts are compounded by thoroughly mixing the cement, sand, gravel, lime, alum, and silicate of soda or potash before any water is added, so that the parts will be as intimately mixed as possible. This is done because as little time as possible consistent with a thorough lubrication of the parts should be consumed in mixing the materials after water is added, for the reason that crystallization or "setting" begins as soon as water is added, and the composition should be molded as quickly as possible before crystallization has set in. Any suitable mixer or stirrer may be used for the purpose, and after the mixing has been effected, as described, from thirty to forty parts of water are added and the ingredients further agitated and mixed, so that the paste or viscous composition formed by the addition of water will be brought into close union with the gravel and sand and distributed well throughout the mass. The more completely the particles are coated with this composition the better will be the results.

I have found that the addition of saccharine matter to the water used for lubrication increases to a considerable extent the strength of the stone. A good saccharine matter is either sugar or an infusion of malt. If sugar be used, a good proportion is five pounds, or thereabout, of the sugar to forty-two gallons, or thereabout, of water. Cold water should be used, as then the best results are obtained. After the ingredients have been thus mixed they are put into the mold and well rammed into a compact mass. When within, say, two inches of the level of the lower face of the core C, two laths, E, are placed lengthwise in the mold transverse to the line of the core. After this more material is filled in until the core is to be introduced. Then the core is inserted in place and the mixture filled in along its sides and on top of it and thoroughly rammed. The laths form a stay, and are to support the newly-formed block while it is being set, so as to prevent it from sagging by reason of the opening after the core is withdrawn. After the block has been formed the sides are removed and the block allowed to stand on the base A for about three days, more or less, or until thoroughly hardened; and while the stone is setting it may be wet with water several times a day to advantage. The laths are placed any suitable distance apart—say so as to lie within the block about one inch or more from its sides and with their ends about one inch from the sides. When the block is finished, it appears, as shown in the drawings, with a hole or aperture extending through it from side to side. This hole is preferably of a tapering form. The hole itself has a tendency to prevent sweating of the stone; but when made under the process described and composed of the ingredients specified effervescence and sweating are more completely prevented. The calcined lime hardens the composition and produces excellent results when combined with the other ingredients mentioned; but the addition of pulverized porcelain aids in hardening the composition. I desire to cover in this case the stone formed of the ingredients without the addition of porcelain.

I have given what I consider to be the best proportions for the best results; but it is obvious that the exact proportions may be changed without departing from the spirit of my invention.

Having described my invention and set forth its merits, what I claim is—

1. A composition for artificial stone having as ingredients cement, gravel or broken stone, calcined lime, silicate of soda or potash, water, and saccharine matter, substantially as described.

2. A composition for artificial stone composed of cement, gravel or broken stone, silicious sand, calcined lime, alum, and silicate of soda or potash, substantially as described.

3. In the process of forming an artificial-stone block with an aperture through it, the method described for preventing the sagging of the material over the aperture, consisting in placing a stay in the material while the material is in a plastic condition across the aperture transversely to the length thereof, substantially as described.

In testimony whereof I affix my signature in presence of two witnesses.

JAMES STANDWOOD PEIRCE.

Witnesses:
 CALVIN PAGE,
 CHARLES W. NORTON.